(12) United States Patent
Chao

(10) Patent No.: US 9,270,038 B1
(45) Date of Patent: Feb. 23, 2016

(54) MULTI-PLUG USB CONNECTOR WITH SWAPPABLE TIP

(71) Applicant: TwinTech Industry, Inc., Los Alamitos, CA (US)

(72) Inventor: Hsin-Chia Chao, Cerritos, CA (US)

( * ) Notice: Subject to any disclaimer, the term of this patent is extended or adjusted under 35 U.S.C. 154(b) by 0 days.

(21) Appl. No.: 14/726,795

(22) Filed: Jun. 1, 2015

(51) Int. Cl.
*H01R 33/92* (2006.01)
*H01R 35/04* (2006.01)
*H01R 11/03* (2006.01)
*H01R 31/06* (2006.01)
*H01R 13/58* (2006.01)
*H02J 7/00* (2006.01)

(52) U.S. Cl.
CPC ............ *H01R 11/03* (2013.01); *H01R 13/5829* (2013.01); *H01R 31/06* (2013.01); *H02J 7/0042* (2013.01)

(58) Field of Classification Search
CPC ...... H01R 25/003; H01R 33/92; H01R 35/04; H01R 31/02; H01R 12/592; H01R 4/34; H01R 27/00
See application file for complete search history.

(56) References Cited

U.S. PATENT DOCUMENTS

| | | | |
|---|---|---|---|
| 6,231,379 B1 * | 5/2001 | Shen | 439/505 |
| 7,057,108 B1 * | 6/2006 | Sodemann et al. | 174/71 R |
| 7,224,086 B2 | 5/2007 | Germagian | |
| 8,308,507 B2 * | 11/2012 | Lin | 439/502 |
| 8,491,330 B2 | 7/2013 | McSweyn | |
| 8,916,774 B2 * | 12/2014 | Richards et al. | 174/70 C |
| 2007/0247803 A1 | 10/2007 | Eickholdt | |
| 2008/0143290 A1 | 6/2008 | Chavakula | |
| 2008/0204992 A1 | 8/2008 | Swenson | |
| 2008/0239681 A1 | 10/2008 | Iida | |
| 2009/0156053 A1 | 6/2009 | Hwang | |
| 2010/0151723 A1 * | 6/2010 | Su et al. | 439/505 |
| 2012/0171892 A1 * | 7/2012 | Sun | 439/505 |
| 2013/0043827 A1 * | 2/2013 | Weinstein et al. | 320/103 |
| 2014/0213101 A1 * | 7/2014 | Gomez et al. | 439/505 |

FOREIGN PATENT DOCUMENTS

JP    4041840    2/2008

* cited by examiner

*Primary Examiner* — Gary Paulmen
(74) *Attorney, Agent, or Firm* — Larson & Larson, P.A.; Justin P. Miller; Patrick A. Reid

(57) ABSTRACT

The Multi-plug USB Connector with Swappable Tip is a device used to connect one or more devices to a power source, allowing for charging of multiple devices. Additionally, the Multi-plug USB Connector with Swappable Tip allows multiple devices to share data connections, allowing for the simple sharing of data.

14 Claims, 10 Drawing Sheets

MULTI-PLUG USB CONNECTOR WITH SWAPPABLE TIP

FIELD

This invention relates to the field of portable charging and data-sharing devices and more particularly to a device for connecting multiple devices to one another.

BACKGROUND

Our world is filled with a multitude of small electronic devices, each with its own connector, each needing to be regularly charged.

As innovation moves forward additional connectors become available, rendering obsolete existing charging devices with outdated connectors. For example, Apple's recent switch from the 30-pin connector to the new Lightning connector. Many accessories have been rendered outdated by this simple change of a plug style.

The result is waste, as well as unnecessary cost to consumers who must regularly purchase new chargers and cables.

What is needed is a device that will allow multiple devices to connect to each other for purposes of sharing power or data, but with a connector that can be updated to match the rapid pace of technology.

SUMMARY

The Multi-plug USB Connector with Swappable Tip is a device used to connect one or more devices to a power source, allowing for charging of multiple devices. Additionally, the Multi-plug USB Connector with Swappable Tip allows multiple devices to share data connections, allowing for the simple sharing of data.

The Multi-plug USB Connector with Swappable Tip includes one or more fixed, or permanent, USB cables, as well as a recessed USB port for a removable USB cable. The removable USB cable allows the Multi-plug USB Connector with Swappable Tip to be updated or adapted to different types of connectors as technology or user desire changes. For example, the removable connector or tip may be a USB-C cable, an Apple Lightning cable, an Apple 30-pin connector, or one of many other types. Anticipated types of USB connector, also known as tips, include:

USB 2.0 Type A;
USB 2.0 Type B;
USB 2.0 Mini Type B, 4 Position;
USB 2.0 Mini Type B, 5 Position;
USB 2.0 Micro B;
USB 3.0 Type A;
USB 3.0 Type B;
USB 3.0 Micro Type B; and
USB 3.1 Type C.

The result is a single device able to share power and data across multiple USB connectors. The Multi-plug USB Connector with Swappable Tip includes a housing with multiple cables leading from the housing. The cables are divided into fixed cables, which are non-removable, and a recessed connection for a swappable cable, which is removable.

Within the description below, a USB plug refers to the male type, and a USB jack refers to the female type.

The housing itself is shown as being made of a front half and a back half, the two halves meeting at a housing seam. But many types of housing are anticipated, including single part housings, housings of many parts, housings molded around the internal parts, and so forth.

Within the housing is a circuit board. The circuit board connects the fixed cables to a connector, or jack, which in turn electrically connects to the swappable cables. In one embodiment, circuit board tracing is used to perform this connection. In others, the fixed cables are directly wired to the connector that in turn joins to the swappable cable. In still other embodiments there are jumpers, or short cables, that connect the fixed cables to the circuit board and its tracing.

The cables are all connected together, allowing for the sharing of power and data among all cables. Stated differently, the Multi-plug USB Connector with Swappable Tip supports multi-input to multi-output data and power sharing, enabling multiple-port to multiple port signal flow engagement for an instant of time. For example, two independent power sources can be combined together in a real time, non-multiplexed fashion, such that the combined signal flow is be delivered simultaneously to multiple recipients in a real time, non-multiplexed fashion. This signal flow can be data, or current to charge a mobile device.

The collection of fixed cables forms a cable bundle. The cable bundle penetrates the housing, exiting through a penetration, or through a space between the two housing halves.

Optionally located between the cable bundle and the housing is a strain relief coupling. The strain relief coupling is preferably a soft and flexible material that surrounds the penetration of the fixed cables, or cable bundle, at the point of connection to the housing. By being more flexible than the fixed cables themselves, the strain relief coupling allows for motion of the fixed cables without transferring the stress to the enclosed wiring. Stress to the cables themselves can cause damage to the enclosed copper wiring. Such damage can in turn shorten the life of the cable.

Returning to the USB connector receiver, or jack, within the housing, this is the location into which the swappable USB cable, or plug, is inserted. This is referred to as the entrance or port. Inserting a swappable USB cable into the USB connector receiver electrically connects the swappable cable to the circuit board, and in turn to the fixed USB cables.

In the preferred embodiment the USB connector receiver is located on or near the circuit board. But as disclosed above, the Multi-plug USB Connector with Swappable Tip may include direct wiring from the USB connector receiver to the fixed USB cables.

The USB connector receiver optionally includes a female USB connector shield, which contacts the shield of the male plug of the swappable USB connector. Partially enclosed by the USB connector shield are contacts standard to Type A plugs and jacks that comply with USB standards. Each contact corresponds to a wire within a cable.

When the swappable USB cable is installed, the cavity for swappable connector hides the connector within the housing, the result being that only the cable protrudes from the housing.

The majority of USB connectors have a polarity, or a top and a bottom. By using an alignment tab, the recessed connector can only enter the housing when the alignment is correctly oriented. As a result the plug and jack match polarity when the plug meets the jack within the housing.

The housing itself has a port through which the swappable cable connector passes. The port includes an alignment tab receiver that interfaces with an optional alignment tab on the recessed connector.

The disclosed cables comply with USB standards, although the cables are anticipated to change as standards are updated and altered.

The disclosed cables may comply with the USB 2.0 standard, where in a given cable there are: two power conductors, one twisted pair of cables for data, and a drain or ground wire as part of shielding.

The disclosed cables may comply with the USB 3.0/3.1 standard, where in a given cable there are: two power conductors, one unshielded twisted pair for data, two shielded twisted pairs for data, and a drain or ground wire as part of shielding.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
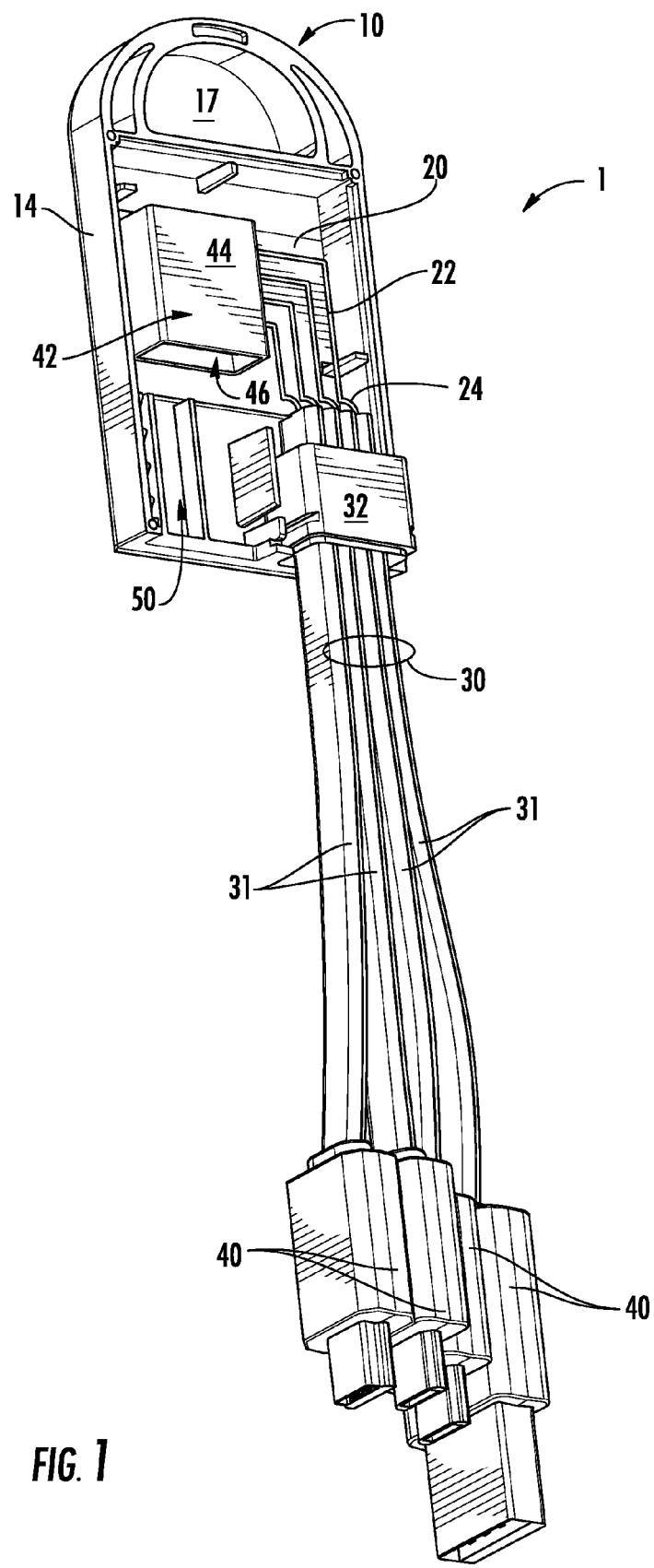
FIG. 1 illustrates a partial cutaway view of a first embodiment.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a partial cutaway view of a first embodiment is shown. Shown is housing back half 14 of housing 10. Although the Multi-plug USB Connector with Swappable Plug 1 is shown with a two-part housing, a single-part housing and a housing constructed of a greater number of parts are anticipated.

Within the Multi-plug USB Connector with Swappable Plug 1 is a circuit board 20, with circuit board tracing 22 on the circuit board 20. The circuit board tracing 22 connects to the jumper wires 24, the jumper wires 24 in turn connect to the cable bundle 30. The cable bundle is made of a number of individual cables 31. Each individual cable 31 terminates in a fixed USB connector 40. The fixed USB connectors are intended to be a permanent part of the Multi-plug USB Connector with Swappable Plug 1.

Surrounding the cable bundle 30 at the location the cable bundle 30 enters the housing 10 is the strain relief coupling 32. The strain relief coupling 32 is constructed of a material more flexible than that of the cables 31 that make up the cable bundle 30. The result is that force applied to the cable bundle 30 results in deformation of the strain relief coupling 32, rather than the cables 31 themselves. The result is increased life of the cables 31 by reducing the frequency and severity of cable 31 deformation.

Also affixed to the circuit board 20 is USB connector receiver 42. USB connector receiver 42 is intended to connect to the swappable cable 60, allowing many different cables to connect to the Multi-plug USB Connector with Swappable Plug 1, thereby allowing the Multi-plug USB Connector with Swappable Plug 1 to be updated as new connectors and cables become available.

The USB connector receiver 42 includes a female USB connector shield 44 that surrounds female USB connector contacts 46. The USB connector contacts 46 in turn connect to the circuit board, and therefore to the fixed USB connectors 40.

The USB connector receiver 42 lies within the swappable connector cavity 50. The swappable connector cavity 50 is of sufficient size to enclose all, or substantially all, of the recessed connector body 64 (not shown). The result is that, when plugged in, only the cable 72 (not shown) of the recessed connector 62 (not shown) protrudes beyond the housing 10.

Opening 17 allows the Multi-plug USB Connector with Swappable Plug 1 to be attached to the user's keys, hung on a hook, or otherwise stored.

Figure 2:
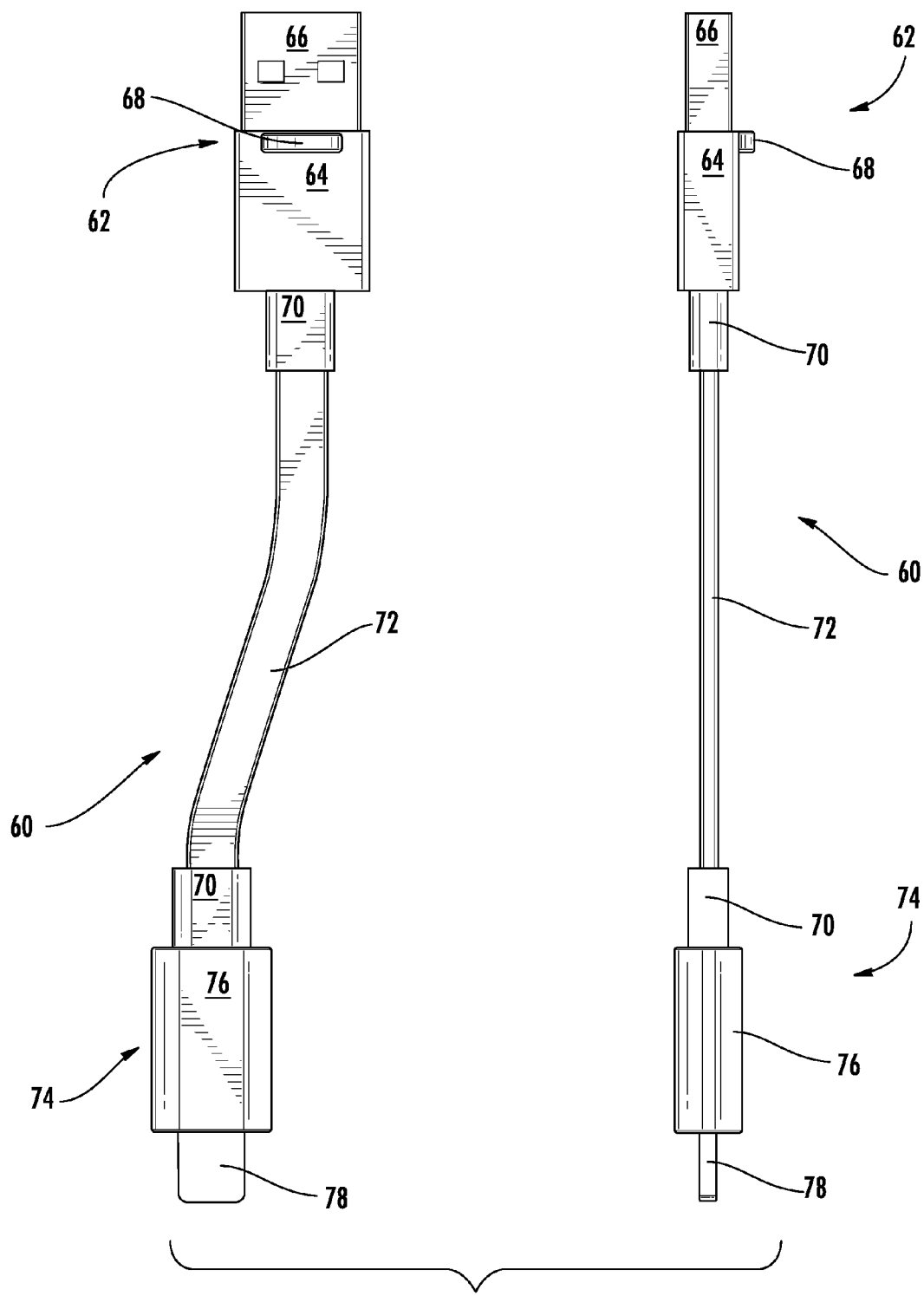
FIG. 2 illustrates a swappable cable of the first embodiment.

Referring to FIG. 2, a removable, or swappable cable 60, of the first embodiment is shown. The swappable cable 60 is the portion of the Multi-plug USB Connector with Swappable Plug 1 designed to be easily removed and exchanged or upgraded. The embodiment within is illustrated with an Apple Lightning connector, but many other possible connectors are anticipated, such as USB 3.1 Type C connectors.

The swappable cable 60 includes a number of parts. Overall, the swappable cable 60 is made of a recessed connector 62 connected to the cable 72, in turn connected to the updateable connector 74.

The recessed connector 62 includes the recessed connector body 64 and recessed connector shield 66. The updatable connector 74 includes the updateable connector body 76 and the updateable connector tip 78. Both the recessed connector 62 and updatable connector 74 optionally include a flexible body extension 70. The flexible body extension 70 acts as a transition between the stiff material of the recessed connector body 64 and cable 72, or updatable connector body 76 and cable 72.

The recessed connector body 64 optionally includes an additional feature, an alignment tab 68. The alignment tab 68 interacts with the alignment tab receiver 52 that is part of port 18. The interaction of the alignment tab 68 and port 18 solves a problem that exists for recessed USB ports.

Figure 3:
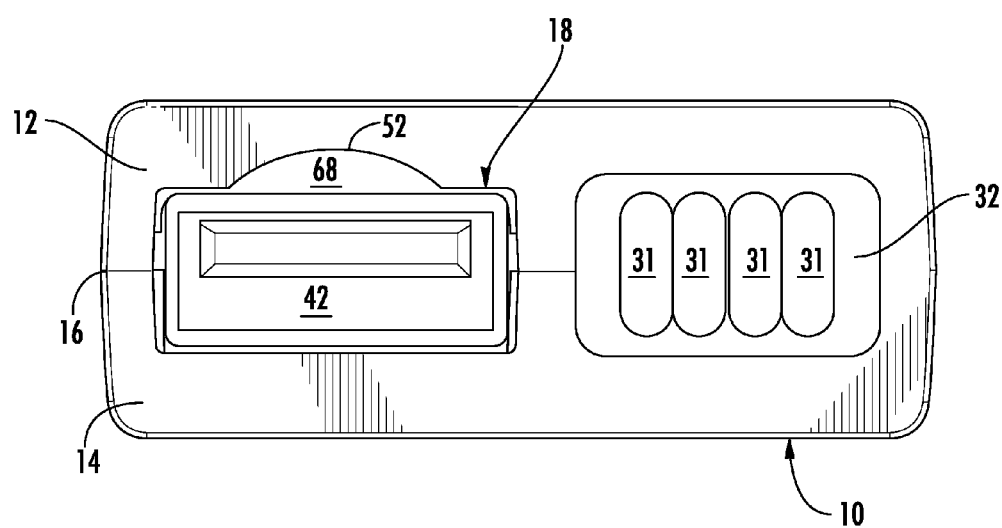
FIG. 3 illustrates a connection port of the first embodiment.

Referring to FIG. 3, a connection port of the first embodiment is shown. Shown is port 18, where swappable cable 60 passes into the housing 10 and swappable connector cavity 50. Alignment tab receiver 52 is shown, as well as fixed cables 31.

USB connections require a specific orientation. With the exception of the upcoming USB 3.1 Type C connector, there is a specific orientation, or polarity, required for a USB jack and connector to interface. But with USB connector receiver 42 is recessed and within a swappable connector cavity 50. As a result the user cannot determine whether the orientation is correct until the swappable cable 60 has largely entered the housing 10. The alignment tab 68 solves this problem.

The recessed connector body 64 of the recessed connector 62 cannot enter the housing 10 unless the alignment tab 68 correctly matches the alignment tab receiver 52. In this way the user is nearly immediately aware whether the swappable cable 60 is correctly oriented, or if it needs to be rotated.

Figure 4:
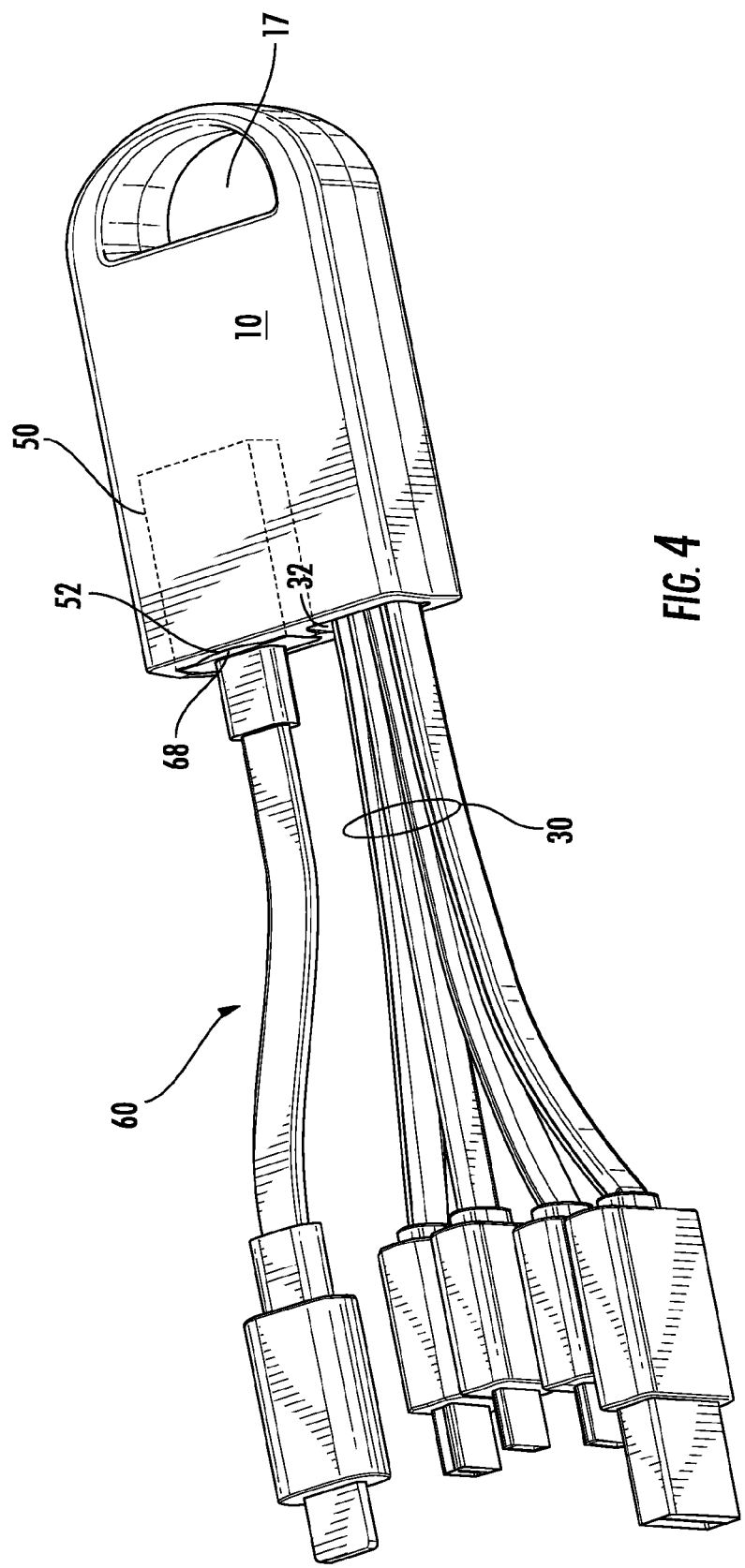
FIG. 4 illustrates an isometric view of the first embodiment with the removable cable inserted.

FIG. 4 illustrates an isometric view of the first embodiment with the removable cable inserted. The overall shape of the Multi-plug USB Connector with Swappable Plug 1 is shown. Also shown is an outline of the swappable connector cavity 50.

Figure 5:
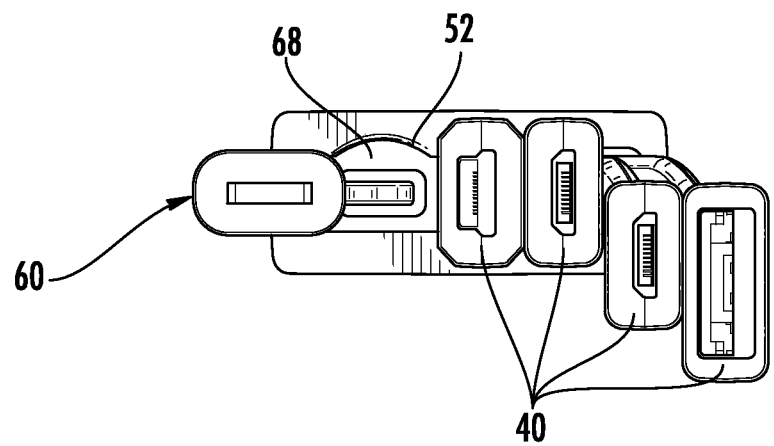
FIG. 5 illustrates a bottom view of the first embodiment.

FIG. 5 illustrates a bottom view of the first embodiment. The interface of the alignment tab 68 and alignment tab receiver 52 is shown.

Figure 6:
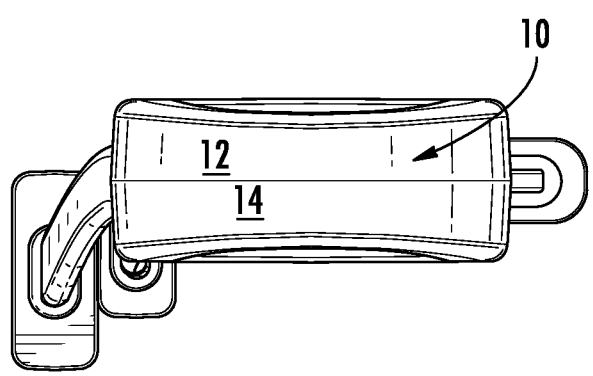
FIG. 6 illustrates a top view of the first embodiment.

FIG. 6 illustrates a top view of the first embodiment.

Figure 7:
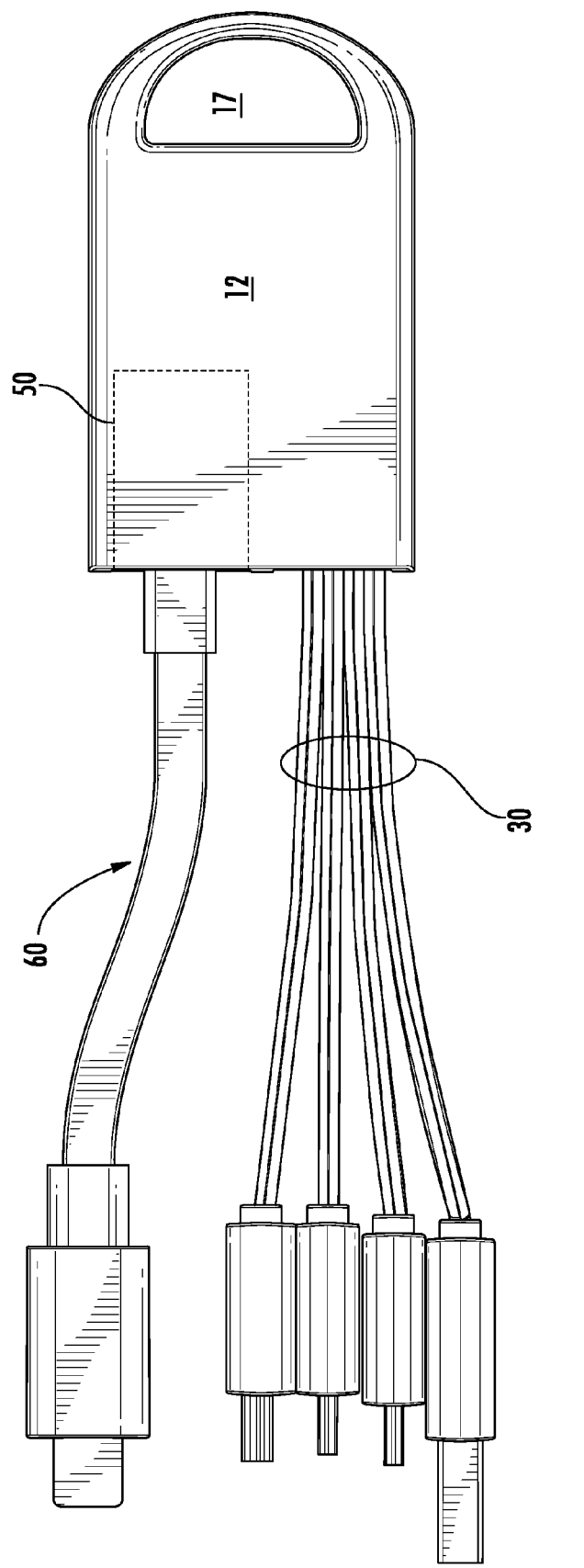
FIG. 7 illustrates a front view of the first embodiment with the removable cable inserted.

FIG. 7 illustrates a front view of the first embodiment with the removable cable inserted. Again shown is an outline of the swappable connector cavity 50.

Figure 8:
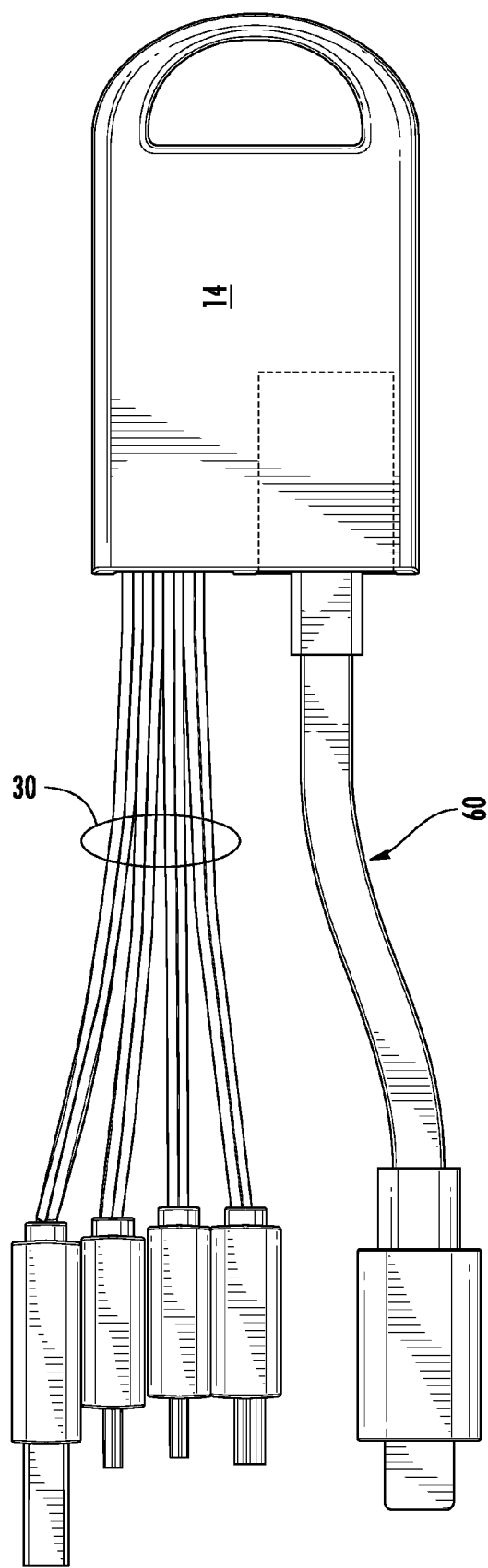
FIG. 8 illustrates a back view of the first embodiment with the removable cable inserted.

FIG. 8 illustrates a back view of the first embodiment with the removable cable inserted.

Figure 9:
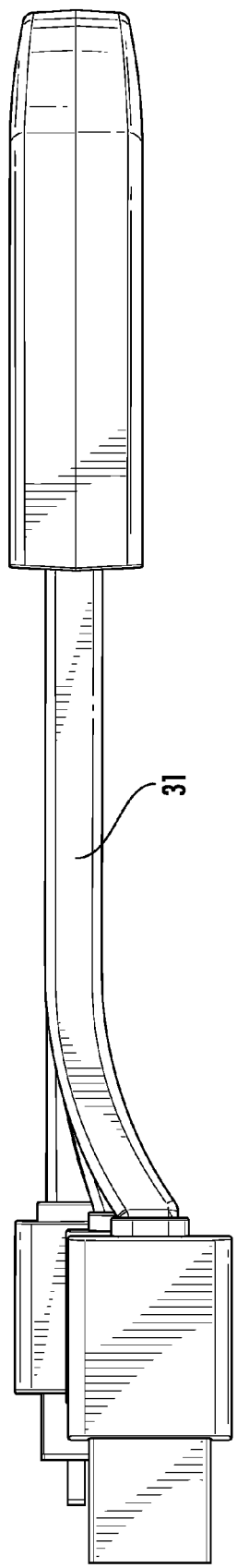
FIG. 9 illustrates a left side view of the first embodiment.

FIG. 9 illustrates a left side view of the first embodiment.

Figure 10:
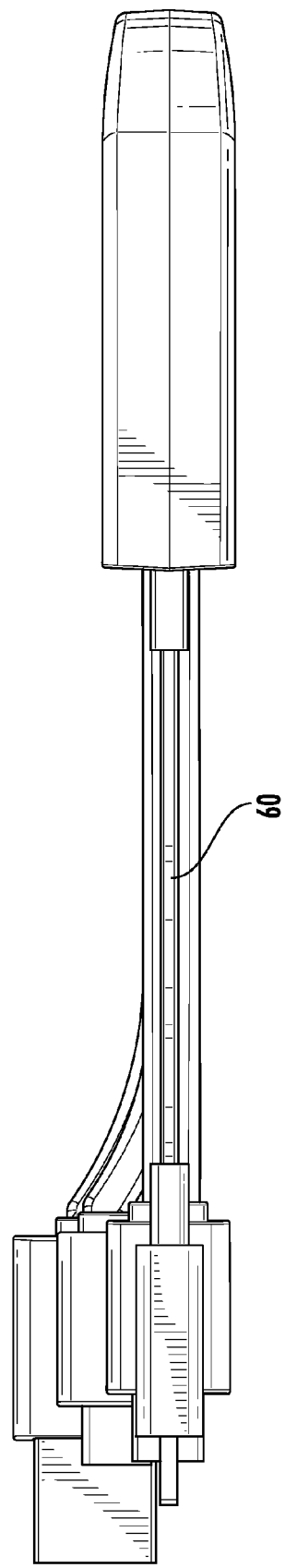
FIG. 10 illustrates a right side view of the first embodiment.

FIG. 10 illustrates a right side view of the first embodiment.

Figure 11:
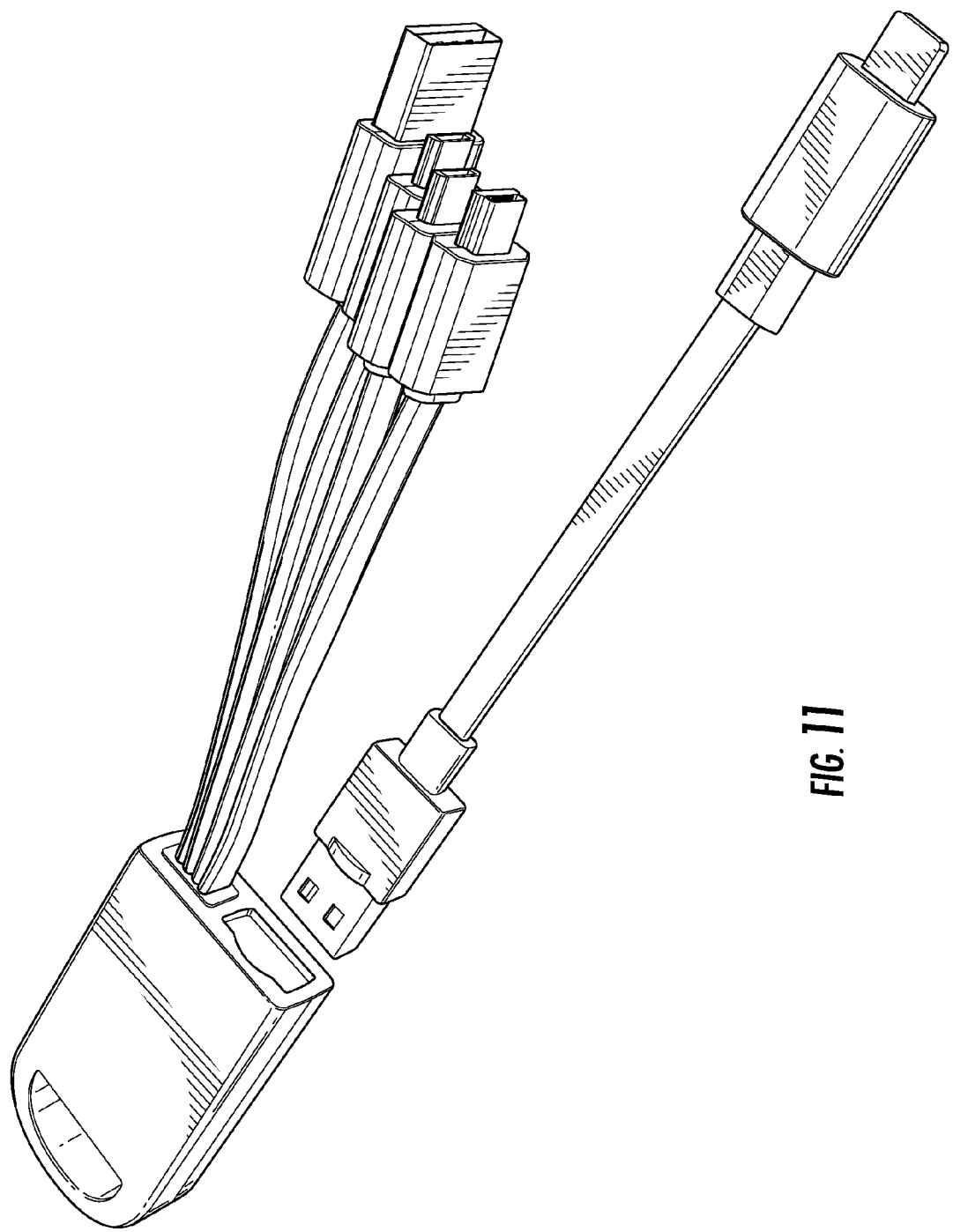
FIG. 11 illustrates an isometric view, showing the swappable cable unplugged.

FIG. 11 is an isometric view, showing the swappable cable unplugged.

Figure 12:
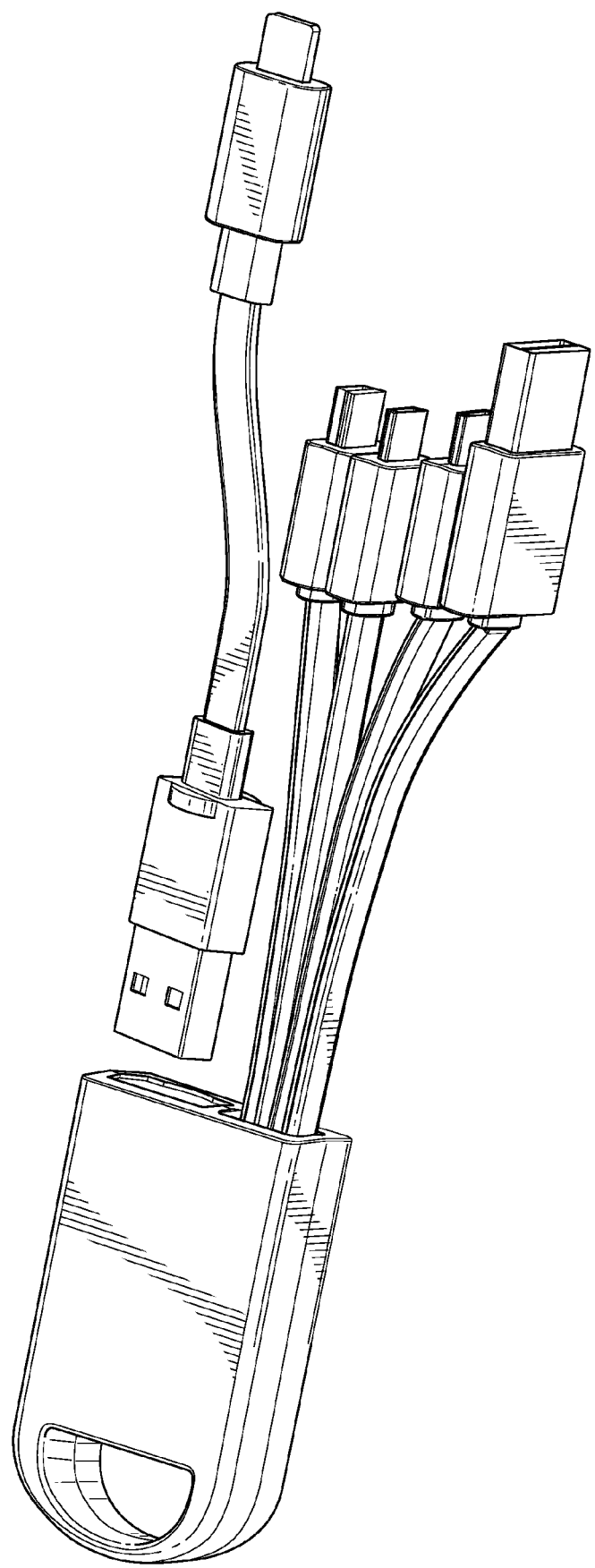
FIG. 12 illustrates an isometric view, showing the swappable cable unplugged.

FIG. 12 is an isometric view, showing the swappable cable unplugged.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device comprising:
   a. a housing having a cavity to receive a replaceable cable;
   b. a recessed connection within the cavity of the housing, the recessed connection to couple to the replaceable cable; and
   c. one or more non-removable cables, the non-removable cables including tips for connection to mobile devices, the non-removable cables terminating within the housing;
   d. an alignment tab receiver located at an entrance to the cavity; and
   e. the alignment tab receiver to interface with an alignment tab located on the replaceable cable;
   f. whereby the alignment tab and alignment tab receiver interact to prevent the replaceable cable from entering the cavity with incorrect polarity.

2. The device of claim 1 further comprising:
   a. the replaceable cable,
   b. the replaceable cable having a first end and a second end, the first end removably coupled to the recessed connection, the second end terminating in a tip for use sharing power with a mobile device.

3. The device of claim 2 wherein when the replaceable cable is connected to the recessed connection the cavity surrounds the first end on all but one side.

4. The device of claim 1 further comprising:
   a. a strain relief coupling;
   b. the strain relief coupling surrounding the one or more non-removable cables where the one or more non-removable cables enter the housing;
   c. whereby the strain relief coupling flexes to limit the strain applied to the one or more non-removable cables during use of the device.

5. The device of claim 1 further comprising:
   a. a circuit board located within the housing;
   b. the circuit board electrically connecting the recessed connection and the non-removable cables.

6. A device with fixed and removable cables, including a removable cable terminated in a tip for use charging a mobile device, the device comprising:
   a. a body supporting multiple fixed cables;
   b. a connection location into which the removable cable is plugged;
   c. the connection location and the multiple fixed cables being electrically connected;
   d. the body includes a space within creating a void, and a hole in the body creating a connection penetration; and
   e. the connection location is within the void, the void surrounding an end of the removable cable such that the end does not protrude beyond the body;
   f. whereby one or more power sources connected to any fixed or removable cable is simultaneously transmitted to all other fixed and removable cables.

7. The device with fixed and removable cables of claim 6 wherein the connection location is of a shape, the shape comprising:
   a. three straight sides;
   b. a fourth non-straight side, the fourth side shaped to interact with the end of the swappable cable, thereby only allowing the swappable cable to be plugged into the connection location when correctly oriented.

8. The device with fixed and removable cables of claim 6 further comprising:
   a. a strain relief coupling located between the multiple fixed cables and the body,
   b. the strain relief coupling made of a material more flexible than the multiple fixed cables, thereby absorbing strain due to motion before the fixed cables bend.

9. The device with fixed and removable cables of claim 6 wherein:
   a. each cable of the multiple fixed cables includes a first wire, a second wire, a third wire, and a fourth wire;
      i. the first wires of each of the multiple fixed cables electrically connected;
      ii. the second wires of each of the multiple fixed cables electrically connected;
      iii. the third wires of each of the multiple fixed cables electrically connected; and
      iv. the fourth wires of each of the multiple fixed cables electrically connected.

10. The device with fixed and removable cables of claim 6 further comprising:
    a. an alignment tab receiver located at an entrance to the void;
    b. the alignment tab receiver to interface with an alignment tab located on the replaceable cable;
    c. whereby the alignment tab and alignment tab receiver interact to prevent the replaceable cable from entering the void with incorrect polarity.

11. A multi-device USB charger comprising:
    a. a housing comprising:
       i. a housing front half,
       ii. a housing back half,
       iii. the housing front half attached to the housing back half at a seam;

iv. a circuit board;
v. a recessed connector, the recessed connector electrically connected to the circuit board;
b. a plurality of non-removable cables with a first set of ends and a second set of ends;
i. the first set of ends electrically connected to the circuit board and to each other;
ii. the second set of ends terminating in tips used to charge mobile devices;
c. a removable cable with a first end and a second end;
i. the first end removably connected to the recessed connector, the second end terminating in a tip used to charge a mobile device;
d. wherein the housing includes a cavity in which the first end of the removable cable is located when connected to the recessed connector; and
e. wherein when the removable cable is connected to the recessed connector, the first end of the removable cable is entirely within the housing.

12. The multi-device USB charger of claim 11, further comprising:
a. a strain relief coupling;
b. the strain relief coupling surrounding the plurality of non-removable cables where the plurality of non-removable cables enter the housing;
c. whereby the strain relief coupling flexes to limit the strain applied to the plurality of non-removable cables during use of the device.

13. The multi-device USB charger of claim 11, further comprising:
a. an alignment tab receiver located at a port that leads to the void;
b. the alignment tab receiver to interface with an alignment tab located on the removable cable;
c. whereby the alignment tab and alignment tab receiver interact to prevent the removable cable from entering the port with incorrect polarity.

14. The multi-device USB charger of claim 11, further comprising:
a. a circuit board located within the housing;
b. the circuit board electrically connecting the recessed connector and the plurality of non-removable cables.

* * * * *